US010394968B2

(12) United States Patent
Kumar et al.

(10) Patent No.: US 10,394,968 B2
(45) Date of Patent: Aug. 27, 2019

(54) COMPUTER AIDED DESIGN SYSTEM WITH IN-CONTEXT MODELING

(71) Applicant: Onshape Inc., Cambridge, MA (US)

(72) Inventors: Malay Kumar, Acton, MA (US); Scott S. Harris, Acton, MA (US); Bo Yuan, Acton, MA (US); Brian Henry Drake, Somerville, MA (US); Noah Samuel Feldman, Boston, MA (US)

(73) Assignee: Onshape Inc., Cambridge, MA (US)

( * ) Notice: Subject to any disclaimer, the term of this patent is extended or adjusted under 35 U.S.C. 154(b) by 7 days.

(21) Appl. No.: 15/840,067

(22) Filed: Dec. 13, 2017

(65) Prior Publication Data

US 2018/0165383 A1 Jun. 14, 2018

Related U.S. Application Data

(60) Provisional application No. 62/433,388, filed on Dec. 13, 2016.

(51) Int. Cl.
*G06F 17/50* (2006.01)

(52) U.S. Cl.
CPC .......... *G06F 17/50* (2013.01); *G06F 17/5086* (2013.01); *G06F 2217/02* (2013.01)

(58) Field of Classification Search
CPC ... G06F 17/50; G06F 17/5086; G06F 2217/02
USPC .......................................................... 703/1, 6
See application file for complete search history.

(56) References Cited

U.S. PATENT DOCUMENTS

| | | | | |
|---|---|---|---|---|
| 6,844,877 | B1 | 1/2005 | Rajkumar et al. | |
| 7,079,990 | B2 | 7/2006 | Haller et al. | |
| 7,853,940 | B1 | 12/2010 | Han et al. | |
| 8,244,508 | B1 | 8/2012 | Dean et al. | |
| 8,248,407 | B2 | 8/2012 | Deslandes | |
| 8,433,432 | B2 | 4/2013 | Matsushita et al. | |
| 8,463,581 | B2 | 6/2013 | Corcoran et al. | |
| 2005/0209722 | A1 | 9/2005 | Kok et al. | |
| 2009/0216358 | A1 | 8/2009 | Hanamoto | |
| 2010/0060635 | A1 * | 3/2010 | Corcoran | G06F 17/5086 345/420 |
| 2011/0213480 | A1 | 9/2011 | Zila et al. | |

(Continued)

OTHER PUBLICATIONS

"In Context Design Part 2" (Progressionsupport), Youtube video, Mar. 5, 2010, https://www.youtube.com/watch?v=2yuVfssnouo.

*Primary Examiner* — Suzanne Lo
(74) *Attorney, Agent, or Firm* — Clocktower Law LLC; Erik J. Heels; Michael A. Bartley

(57) ABSTRACT

A method is disclosed to model a part in the context of one or more assembly states. This method stores references of one or more states of one or more assemblies that a user wants to model a part against, and allows the user to reference surrounding parts from references of assembly states in one or more parametric features. Each reference of assembly with other necessary data is stored in a user object called a context. The assembly can be modified to move components as per desired motion while the part is modeled against one or more assembly states. Also provided is an interface to manage assembly states that are important for a part design for relating to other parts in the assembly. Such interface lets the user update one or more assembly states and associated features for each state at any time during design cycle.

11 Claims, 10 Drawing Sheets

(56) References Cited

U.S. PATENT DOCUMENTS

| | | | | |
|---|---|---|---|---|
| 2012/0290271 | A1 | 11/2012 | Diguet | |
| 2015/0356207 | A1* | 12/2015 | Reitman | G06F 17/5095 703/1 |
| 2016/0004791 | A1* | 1/2016 | Hollmann | G06F 17/50 700/98 |
| 2016/0246899 | A1 | 8/2016 | Hirschtick et al. | |

* cited by examiner

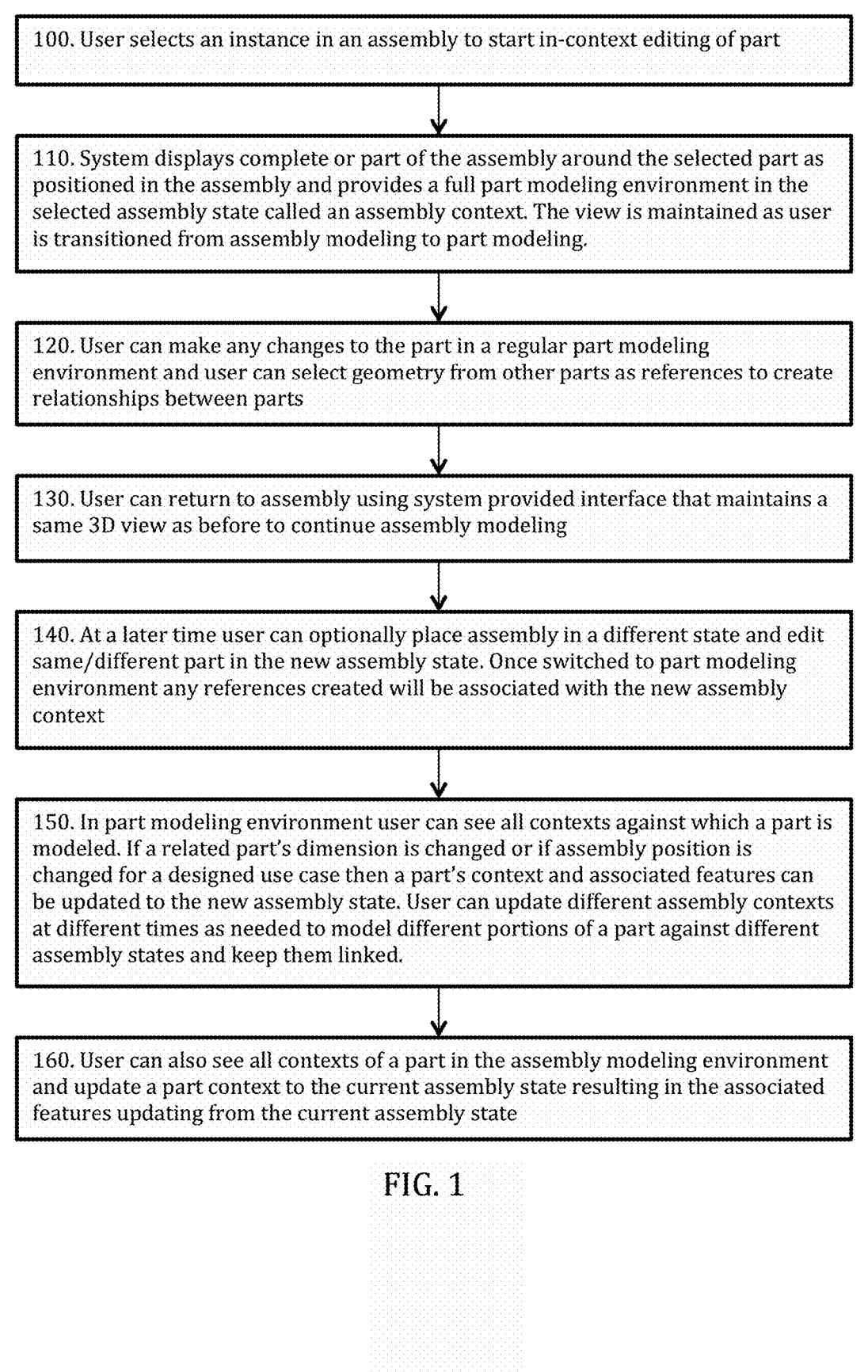

100. User selects an instance in an assembly to start in-context editing of part 110. System displays complete or part of the assembly around the selected part as positioned in the assembly and provides a full part modeling environment in the selected assembly state called an assembly context. The view is maintained as user is transitioned from assembly modeling to part modeling.

120. User can make any changes to the part in a regular part modeling environment and user can select geometry from other parts as references to create relationships between parts 130. User can return to assembly using system provided interface that maintains a same 3D view as before to continue assembly modeling 140. At a later time user can optionally place assembly in a different state and edit same/different part in the new assembly state. Once switched to part modeling environment any references created will be associated with the new assembly context 150. In part modeling environment user can see all contexts against which a part is modeled. If a related part's dimension is changed or if assembly position is changed for a designed use case then a part's context and associated features can be updated to the new assembly state. User can update different assembly contexts at different times as needed to model different portions of a part against different assembly states and keep them linked.

160. User can also see all contexts of a part in the assembly modeling environment and update a part context to the current assembly state resulting in the associated features updating from the current assembly state

FIG. 1

COMPUTER AIDED DESIGN SYSTEM WITH IN-CONTEXT MODELING

CROSS-REFERENCE TO RELATED APPLICATIONS

This utility patent application claims priority from U.S. provisional patent application Ser. No. 62/433,388, filed Dec. 13, 2016, titled "COMPUTER AIDED DESIGN SYSTEM WITH IN-CONTEXT MODELING", naming inventors Malay Kumar, Scott S. Harris, Bo Yuan, Brian Henry Drake, and Noah Samuel Feldman.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017, Onshape Inc.

BACKGROUND

Field of Technology

This disclosure relates to computer software systems for computer aided design, and more particularly to computer aided design software which include in-context modeling.

Background

Two basic components of parametric Computer Aided Design (CAD) systems are part models and assembly models. Parts are generated from an instruction set called a parametric history. Each history is an ordered list of features, parameters and relationships needed to create one or more parts. Assemblies consist of parts and relationships between parts which position them and allow each component (instances of parts) to move within prescribed constraints. Parts are typically designed in a separate modeling environment (such as a computer graphical display editing window) from other parts, as each part has a unique parametric history. Assemblies are also typically designed in a separate modeling environment (such as a computer graphical display editing window), in which multiple parts can be positioned and connected through "mates." These two distinct components and associated modeling environments make it challenging to model a part so that it references the geometry of other parts as well providing required motion to surrounding parts at the same time.

Often when designing complex mechanical mechanisms, designers start with some known shapes and position corresponding parts into an assembly. The geometry and position of these parts in the assembly is used to inform the shape of new parts. New parts are created from features of which one or more directly reference geometry that is dependent on the assembly position and composition. These are referred to as in-context references. For example layout sketches are often used to position standard components as well as provide geometry (sketch profiles) for the creation of new parts. When the sketch changes, these referenced parts are updated to reflect the changed mechanism.

In a fast paced design environment parts and assemblies are also modeled and modified by multiple designers often at the same time. That introduces another challenge to not stop other users from using an assembly while a user is designing a part in the context of same assembly.

DESCRIPTION OF PRIOR ART

Conventional CAD systems allow references between components in an assembly. When references are made, the user has a choice of behavior. They can allow the reference to always change as the assembly changes or they can lock or break the reference. In the case where the reference always updates as the assembly changes, there is an undesirable effect when the item changes with each dynamic movement. The other control is to lock or break the reference. Here there is an undesirable effect because it is extremely difficult to update the references when a referenced item's geometry changes. In conventional CAD systems, it is very difficult to return to the exact state when lots of changes have occurred. An assembly may undergo many part changes and instance movements making it very hard to return the assembly back to the exact state of any particular reference, let alone all of the references. Existing solutions rely on rules to update references every time the state changes, or lock the references to never update when the state changes. If the user wishes to update any references for a particular part, they need to update all of the references for that part.

Regardless of how references are managed, the exact state of the assembly is transient and not stored as part of the reference. Any particular reference has no notion of the original assembly state. These methods also don't provide good ways to create and manage in-context references when a part needs to be modeled in context of multiple assembly states. In real design scenarios when a part need to be modeled in multiple assembly states, the part needs to reflect changes in these states but because of lack of tools to support this workflow designers often break those references which makes them not updateable when required.

Another disadvantage of conventional CAD systems that are file based, references between files become unwieldy and can be lost when file control system are used to control access to some files. Many companies use the convention to break all in-context references when files are checked into a file control system.

U.S. Pat. No. 8,463,581 (Jun. 11, 2013, Corcoran et al., "ASSEMBLY-BASED PARAMETRIC MODDELER") discloses, in the Abstract, "Presently disclosed is a process and system for assembly-based parametric modeling having a single design environment in which the parts, components, and assemblies thereof may be designed concurrently. In embodiments of the present invention, every assembly has a deterministic parametric history supporting both top-down and bottom-up assembly design methodologies. Top-down components may be built in place, reducing the user interaction required to define the attachment and movement characteristics of the assembly. Bottom-up components may be inserted into an assembly using a parametric Insert Component Feature. The process and system also provides the ability to parametrically define the shape of an assembly in multiple orientations that still regenerate deterministically." Corcoran teaches a merge of bottom-up and top-down design with assembly-context part design.

U.S. Pat. No. 8,433,432 (Apr. 30, 2013, Matsushita et al., "APPARATUS AND METHOD FOR SUPPORTING CREATION OF ASSEMBLY DATA") discloses, in the Abstract, "Techniques to manage position information of parts such that, if discrepancy of the parts occurs, the discrepancy can be detected and corrected while the advantages of using the constraint conditions can be offered. In one embodiment when an input unit receives information of an icon click, a receiving section receives the information of the click, and a saving section saves the position and the angle of geographic data indicating the three-dimensional geometry of the part as absolute-position information calculated with reference to the absolute origin into the storage unit. Then, when updating geographic-data position information on the basis of relative-position information indicating the constraint condition in the assembly data, an updating section instructs a display-data output section to display the consistency/inconsistency with the stored absolute-position information on a display, and a correcting section corrects the updated geographic-data position information on the basis of the stored absolute-position information."

None of the above provides a parametric CAD solution with part design with references to an assembly context which preserves references through movement of the assembly and allows references in the same part design to the assembly in different states. What is needed, therefore, is a solution that overcomes the above-mentioned limitations and that includes the features enumerated above.

BRIEF SUMMARY

A method is disclosed to model a part in the context of one or more assembly states. This method stores references of one or more states of one or more assemblies that a user wants to model a part against, and allows the user to reference surrounding parts from references of assembly states in one or more parametric features. Each reference of assembly with other necessary data is stored in a user object called a context. The assembly can be modified to move components as per desired motion while the part is modeled against one or more assembly states. Also provided is an interface to manage assembly states that are important for a part design for relating to other parts in the assembly. Such interface lets the user update one or more assembly states and associated features for each state at any time during design cycle.

Features and Advantages

Within a system of parametric CAD, an instance of a part may be selected within an assembly for editing. The parametric CAD software creates an assembly context, preserving a fixed positioning of the assembly around the selected part instance. A part can be modeled in the context of the frozen assembly state (fixed positioning) and the assembly can exhibit motion at the same time.

When editing the part in part editing mode, the assembly context may be visually displayed and available for selection to create relationships or references. A database implementation for storing part, assembly, and context data enables assembly data to be always available and easily fetched to display in a frozen assembly state (assembly context).

Because the references are to parts in the assembly context instead of potentially movable references within the general assembly, users can create stable references to other parts in an assembly without worrying about unintended changes to parts if part instances are moved within the assembly. Other users or collaborators working on the same design, simultaneously or at separate times, can modify the assembly without affecting the part being edited within an assembly context.

Multiple assembly contexts may be created for the same instance allowing users to design one or more parts using multiple assembly states. Movement within the assembly between different assembly contexts may expose multiple geometries or limitations useful in part references which may not be accessible from one assembly context alone.

Multiple assembly contexts used in part editing may also be from different assemblies, allowing part design to factor multiple target models. Assembly contexts can be of the same or different assemblies using the same or different parts from a part history.

Benefits of this solution also include:

A significantly improved workflow when a user wants to create references to geometry of other parts in multiple assembly states by providing user objects called assembly contexts.

Providing an interface to manage references to external parts per assembly state for effective in-context modeling.

Providing a way to update related parametric features from referenced assembly instances in desired assembly states (at user selected times). An assembly context can also be updated to new version.

A part can be updated from an assembly as well as within a part modeling environment.

A part can be opened in its own modeling environment and modeled in the context of any key assembly states without needing to open assembly environment.

Multiple assembly designers can use or edit the assembly without being affected by editing, separately or simultaneously, of a part in a different assembly state.

BRIEF DESCRIPTION OF THE DRAWINGS

In the drawings, closely related figures and items have the same number but different alphabetic suffixes. Processes, states, statuses, and databases are named for their respective functions.

FIG. 1 is a flowchart showing steps of in-context modeling.

DETAILED DESCRIPTION, INCLUDING THE PREFERRED EMBODIMENT

Figure 2:
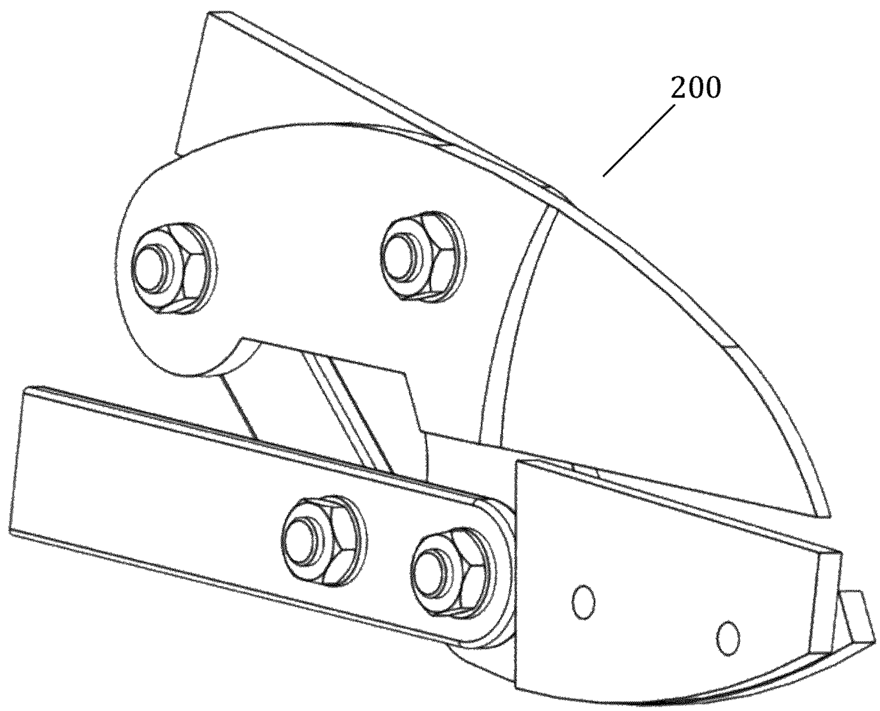
FIG. 2 shows an assembly with a stop plate to be edited in-context in a closed state.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

Assembly—a group of components (parts and subassemblies) combined in a specific way to serve a particular function. Each assembly has its own feature list that contains instances (of parts and sub-assemblies), mates, mate connectors, groups, and relations.

Assembly state—Assembly state is a snapshot of an assembly including composition of its instances, version/states of its instances and positions and allowed movements of its instances.

Context—An assembly/model state to model other parts around.

Instance—a reference within an Assembly to either a part defined in a Part Studio or to a sub-assembly defined in another Assembly Master Instance—An instance in context that is being edited and other instances are positioned relative to master instance Occurrence—the realization of an instance within an assembly or subassembly.

Part—a named geometric construction, which can be combined and constrained with other parts to create an assembly.

Part Studio: where a user creates parts. A Part Studio contains a Feature list (parametric history) and a list of Parts generated by that feature list.

Reference—relationship between design geometry, tracked as an object that can be used to retrieve required data from another instance or geometric entity Subassembly—a smaller group of components assembled separately but designed to be incorporated into a larger assembly.

Operation

CAD System

In-context modeling is implemented within a software system for parametric CAD. One example preferred system is Onshape CAD, as detailed in U.S. patent application Ser. No. 15/052,418 ("Multi-User Cloud Parametric Feature-Based 3d CAD System", filed Feb. 24, 2016, naming inventors Hirschtick et al.), which is hereby fully incorporated by reference. The CAD software program may be run entirely on a single computer system, or across multiple computer systems as a distributed or cloud software solution.

A client computer device operates a display and receives user input, such as through a mouse, keyboard, or touchscreen. A user interface is rendered on the display for user control of the CAD program, either run directly from the CAD software program or run as a user interface program, such as a browser-based user interface, in communication with the CAD software program. Within the user interface, the user may manage projects for designing models, including management, creation, and editing of assemblies and parts. The CAD software program accesses storage for retaining assemblies and parts, such as file-based or through a database, and memory for managing data objects representing the assemblies and parts during display and editing through the user interface.

Within the preferred Onshape CAD software program, design models are tracked as projects having multiple tabs to access editing screens for assemblies or parts. Assembly editing is accessed through assembly tabs, and part editing through part studio tabs.

Part design involves using CAD operation tools to modify sketches into part shapes. The order or operations applied may influence the resulting part, and may be stored in a part history. Parameters of the operations may be explicitly set by a user, or may be set by reference to other geometry. Reference to other geometry allows ensuring size or fit matching, such as sizing a part or aspect of a part to match a different part. If the referenced part changes or is moved, the result can alter and potentially break the referencing part—such as making it impossible for the CAD software to successful rebuild the part based on the part history and assembly state. Using references through assembly contexts solve this problem and avoids impact on referencing parts when a referenced part is altered or moved.

Creating an Assembly Context

Referring to FIG. 1, to use in-context references, an assembly context is needed. To create an assembly context, a user may be within an assembly view to edit an assembly or sub-assembly. FIG. 2 shows an example assembly 200. Within that view, the user may select a part. With a part selected, the user may then select a command 100 to edit the part in context. This command may be a dedicated button, selection from a drop-down menu or pop-up menu, key command or shortcut, or other control selectable through the user interface.

When an assembly context is created, it may be named for later reference by the user through standard user interface controls to input text. The assembly context name may be similarly edited later if desired by the user. After naming, the assembly context may be stored, such as to a database or file, for later reference. Alternatively, storing the reference may be delayed until a first in-context reference is established.

Assembly Context Details

The assembly context is a program data object used in a part modeling environment including a reference, or pointer, to an immutable assembly state. In the preferred Onshape CAD, and similar database-based CAD systems, references to assembly states may be created and tracked without having to copy data about specific parts. In alternate file-based CAD systems, copying of part or assembly data may be necessary for the assembly context object. One method to create and preserve immutable assembly states is to create an assembly version, which in the preferred system records the assembly state at the time of version creation. Each assembly context may then reference the specific assembly version to reach the assembly state.

The assembly context also includes a master instance. The master instance is an instance of the part selected at creation of the assembly context, and is used for orienting the assembly context when used. The assembly state, when used, is shown as positioned around the master instance. The master instance may be tracked as part of the assembly context data object, and may be retained immutably by the assembly context to preserve the orientation and assembly state of the context.

The assembly context also includes all references created based on that context, and copies of minimal bodies for each reference each containing exactly one top level topology of the minimal bodies. For example, if a face is referenced the minimal body may be a sheet body with one face, while if an edge is referenced the minimal body may be a wire body with one edge. These references are added to the context and created during part modeling.

The assembly context data object may be stored, such as to a database in the preferred Onshape CAD, for preservation with a CAD project and future reference.

Part Modeling Using Assembly Contexts

Figure 3:
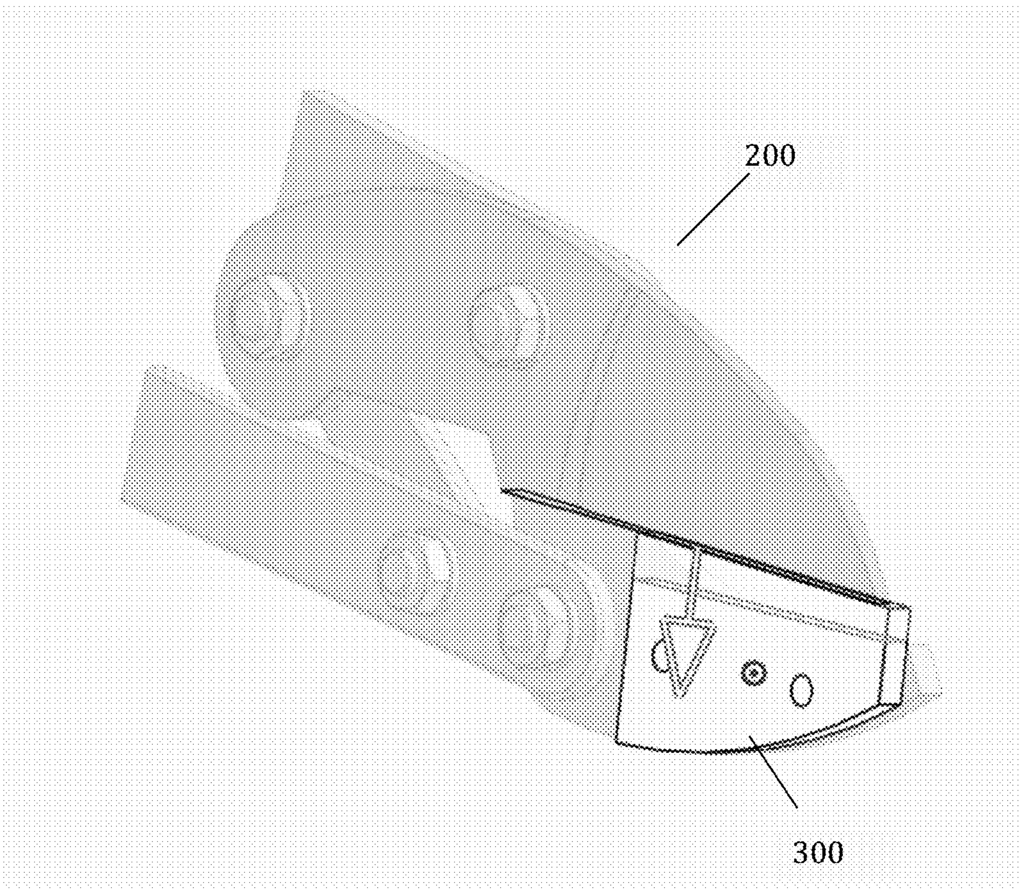
FIG. 3 shows the stop plate of FIG. 1 using in-context reference from a "closed" context.

Once an assembly context is created, the CAD software switches 110 to a part modeling or editing environment, such as a part studio tab within Onshape. Within that part modeling environment, the part is shown (and editable) while the rest of the assembly is displayed, but not editable, around the part being edited. FIG. 3 shows the example assembly 200 in an assembly context with one part 300 editable and the rest of the assembly displayed but not editable. The CAD software uses the master instance to correctly orient and display the assembly state around the editable part within a part coordinate system used for the part modeling environment.

Figure 4:
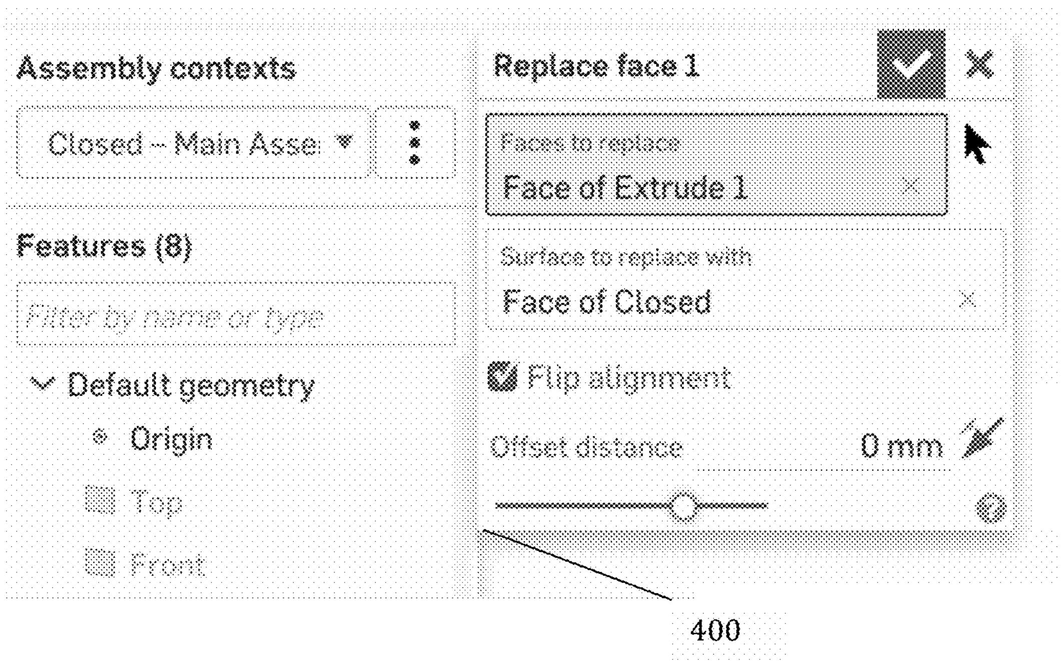
FIG. 4 shows a context list user interface control and a feature dialog showing reference from the closed context, and context list shown new context 'Open.'
Figure 5:
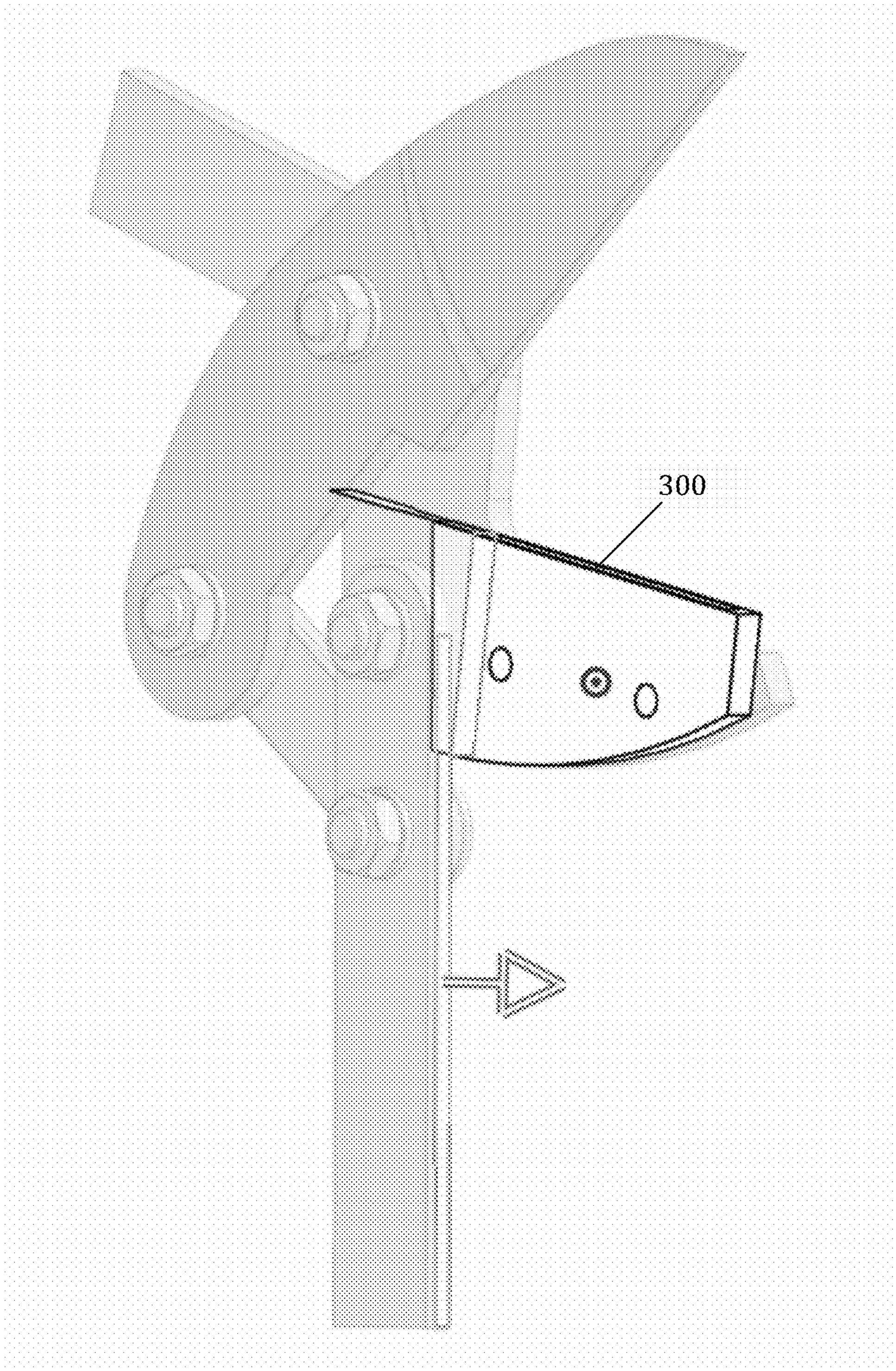
FIG. 5 shows a reference selected from 'Closed' context to define a limit plate reference in the closed context.
Figure 6:
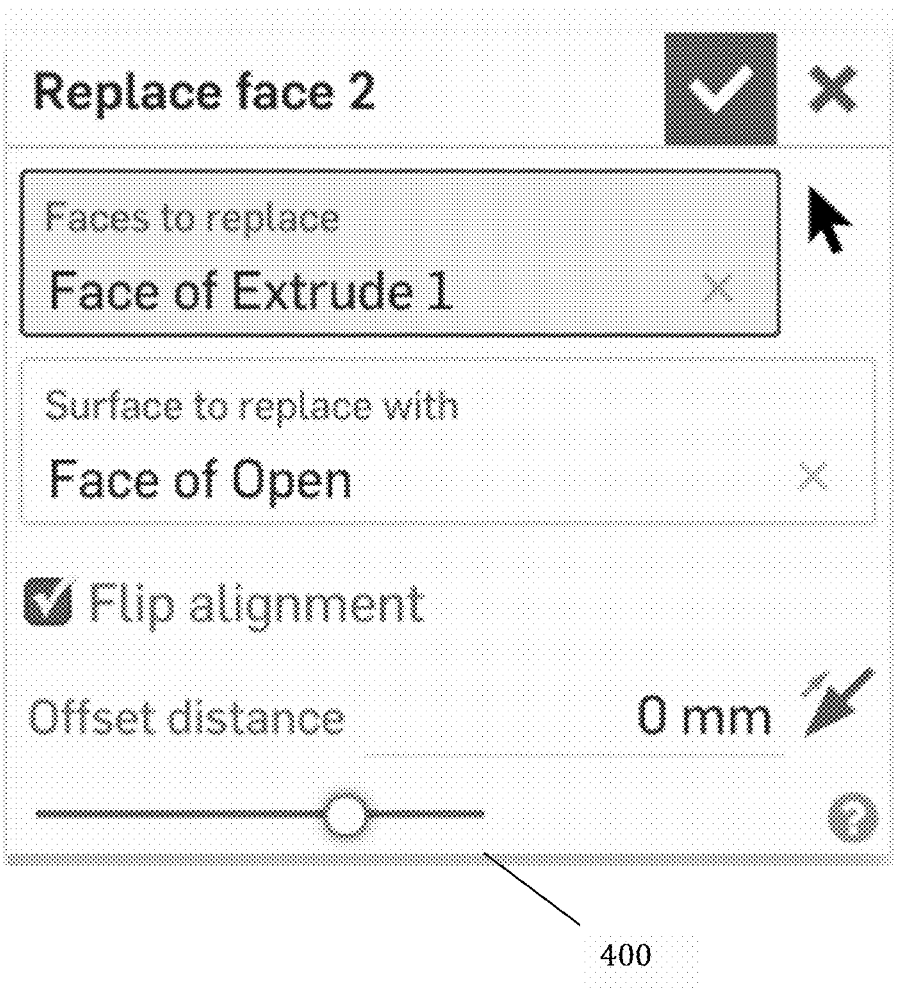
FIG. 6 shows a feature dialog with reference from 'Open' context.
Figure 7:
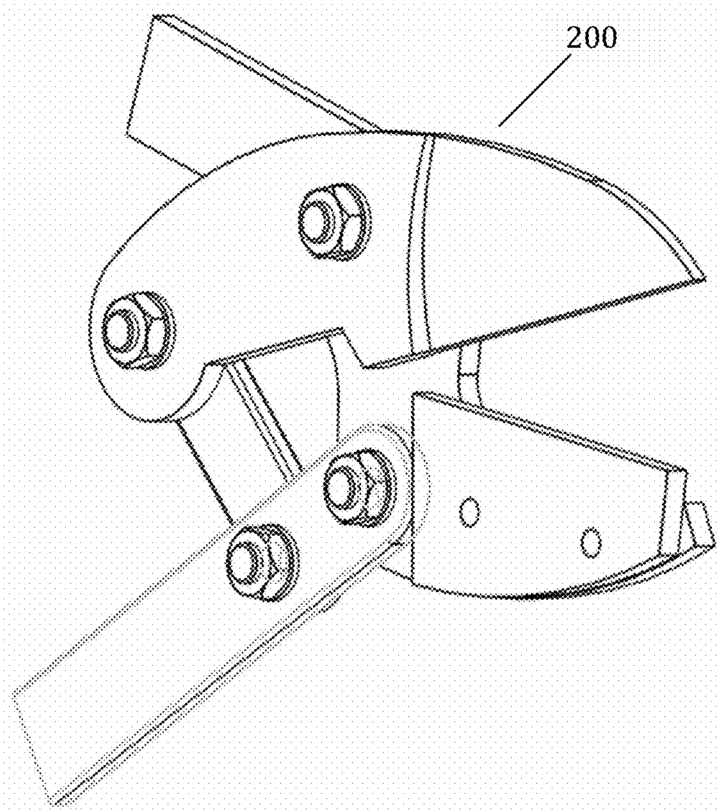
FIG. 7 shows the assembly showing motion with limit plate defined using 'Open' and 'Closed' contexts.

A user editing the part may select 120 any displayed entity within the assembly state to use as a reference for any feature being edited or added within the part modeling environment. A user interface control allows toggling display of the assembly context, allowing user control of whether the assembly state is visible or hidden. The user can exit 130 in-context editing at any time, returning to assembly modeling. In addition, while in part editing if any other assembly contexts exist, interface controls allows selection 140 between the different assembly contexts. FIG. 4 shows example interface controls 400 allowing selection of specific context and editing options of features with reference within the context. This allows the user to switch between different assembly states around a part being edited, allowing references to be created which may not be possible from every assembly state (such as parts or edges being blocked or exposed by movement within the assembly). FIG. 5 shows the same example part 300 being edited in a different assembly context. FIG. 6 shows example interface controls 400 with reference to the different context selected. FIG. 7 shows the resulting example assembly 200 with the part (a limit plate) defined using both example assembly contexts ('Open' and 'Closed' contexts).

If assembly contexts exist for a part, the assembly context interface control may be present 150 in the part modeling environment regardless of the method of entering the part modeling environment, allowing reference-in-context creation at any time during part editing. A "current context" option may also be presented within the context interface control, and present and selectable even if no other context exists, allowing creation of an assembly context from the current state of the assembly while editing a part within the part editing environment. Contexts may also be selected 160 from within the assembly editing environment, allowing selection and updating of any part context to the current assembly state.

Changes to an Assembly Context

Figure 8:
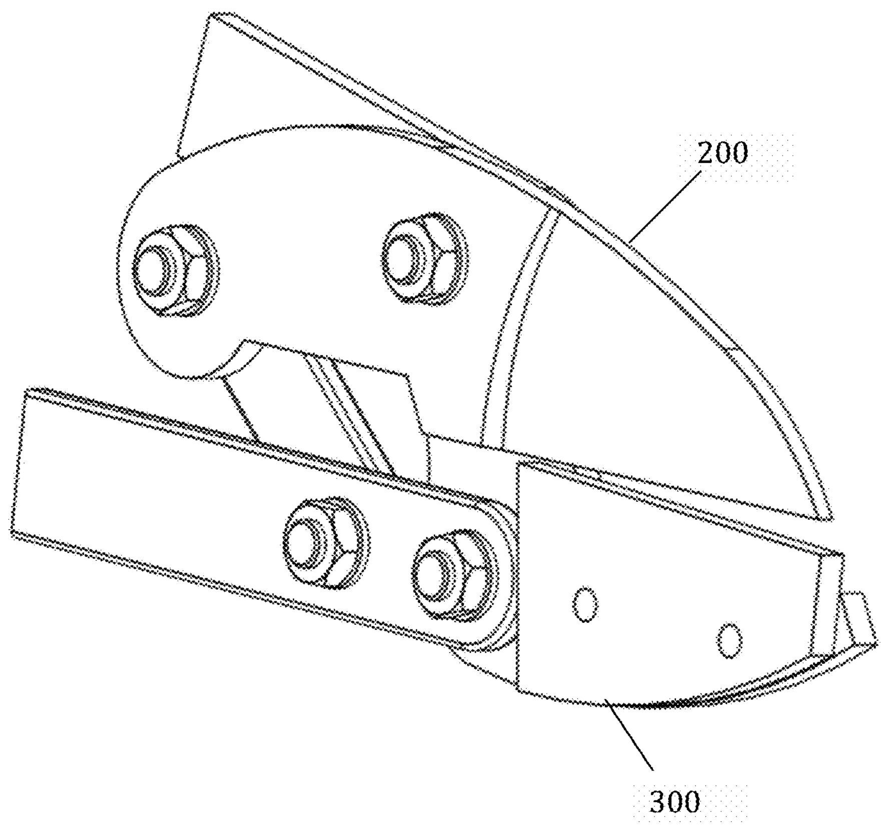
FIG. 8 shows the assembly with need to update the limit plate.
Figure 9:
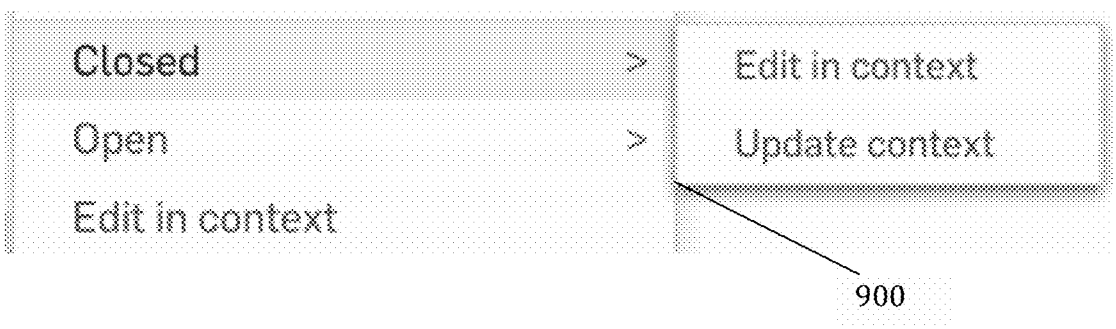
FIG. 9 shows user interface controls to select context and available operations to update the limit plate.
Figure 10:
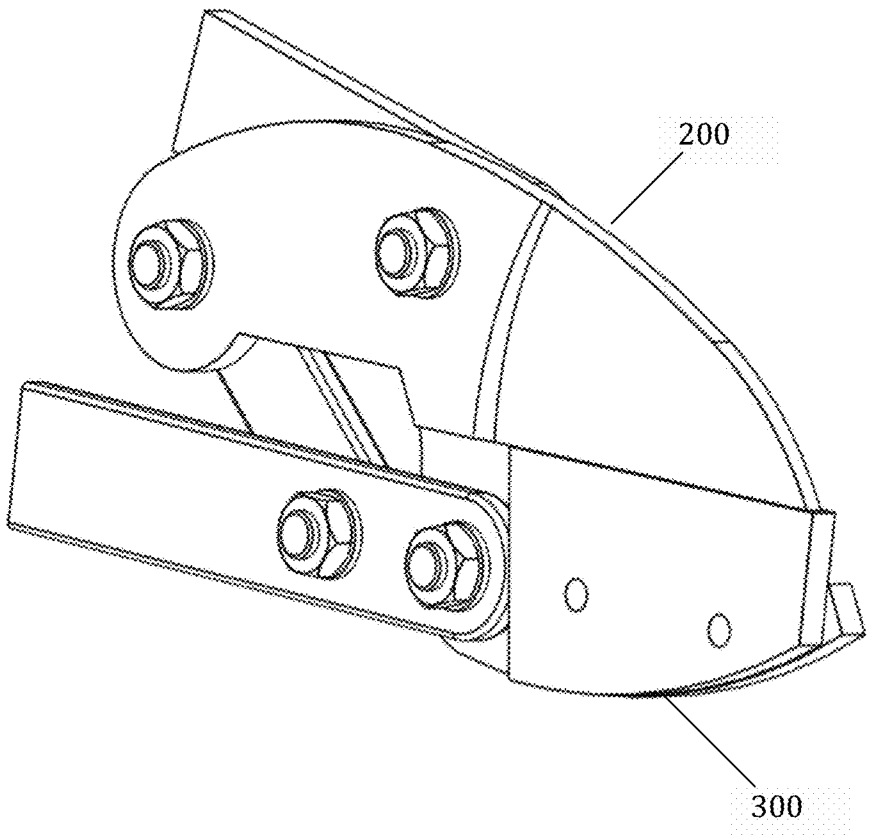
FIG. 10 shows the limit plate after selecting update from the 'Closed' context operation.

If changes to a CAD project requires change to the assembly state of a context, then the context can be updated to a different assembly state. A user interface control to update may be provided in either or both the part modeling environment and assembly modeling environment. During update, each reference stored in the assembly context is updated to the different assembly version, or alternatively to the current assembly display. This update process may be presented to the user through user interface controls to confirm updating should occur, including selection of new topology for updating the reference and confirmation control to commit the change. FIG. 8 shows the example assembly 200 in an state being redefined and needing to update the part 300. FIG. 9 shows example user interface controls 900 to select context, editing, and updating options. FIG. 10 shows the example assembly 200 with the part 300 updated after selecting update from a specific context operation (the 'Closed' context). Optionally, the update controls may also show a preview of the effect of updating a reference. Each reference created and/or associated with a context is updated with a new copy of geometry such that the referenced topology or sub-topologies resolve to corresponding new topology and sub-topologies if available in new assembly version.

This is enabled because each in-context reference includes a reference to an instance and a parametric history based reference to the topology of a part within a part environment of the instance. Also included is an association of this reference data to a copied minimal body for the in-context reference. All downstream feature references are made through reference to the topology of the copied minimal body. All in-context references created from a context and their association with copied minimal bodies are stored with each context. During update the instance reference is compared to find a transform of the geometry in the assembly coordinate system. Topology is also found from a part environment using the parametric history based reference. The assembly state of the context is then updated to the new assembly state. The topology, and an associated minimal body, are copied from the part editing environment to replace the minimal body in the context. Since all downstream features reference other part environment data through the copied minimal body, those references continue to work. Error conditions may exist that prevent updating, such as transformed geometry not present in the assembly or topology is not found in the part environment. In such cases, an empty copy may be used followed by user interface prompts for a user to edit the feature and select a replacement to use in the reference.

After updating of the minimal body, each sub topology of the original minimal body is mapped to a corresponding sub topology of the new minimal body so any references to the sub topology also keep working. For example, if a Face is referenced from another part studio, the face is copied as a sheet body (minimal body) initially. During update, a new sheet body replaces the prior minimal body and each edge and vertex of the original copy is mapped to a corresponding edge and vertex in the new copy.

If a user decides to have no link to an assembly, the user can delete individual assembly contexts. The topologies which were part of the assembly context may be retained as if created or imported in same part history, allowing the part to still regenerate deterministically.

Other Embodiments

The following alternate embodiments may be implemented individually or in any combination with the preferred embodiment previously described.

In an alternate embodiment, the assembly context selection controls within the part modeling environment may display more information about each context, such as the references contained within, and allow moving a reference between contexts.

In an alternate embodiment, the assembly state displayed around the master instance in a part editing environment may be limited. This may be particularly useful in large assemblies. The determination of what portion of the assembly state to display may be automatically determined, or user adjustable through user interface controls separate from or integrated into the assembly context controls. For example, a proximity for display may be adjustable and based on distance (showing only the assembly geometry within the set distance from the master instance), based on connections (showing only the assembly geometry within the set number of connections from the master instance), another geometry-based proximity determination, or any combination of proximities. The proximity display value, or rule if based on multiple values, may also be stored as part of the assembly context data object.

In an alternate embodiment, the CAD software user interface may display an alert or message indicating that the user should update assembly context references. This may be automatically triggered based on rules, such as geometry changes beyond a tolerance, assembly configuration changes, or changes to named assembly states.

In an alternate embodiment, the master instance may be changeable. This may be required if a part history changes significantly such that a part instance needs to be replaced, if a part instance is deleted, or if an assembly is restructured. Also, if a master instance is deleted and replaced with a new equivalent instance in the assembly from the same part studio (therefore the instances refer to the same parametric history) then the assembly context can be updated to change the master instance to the new instance.

In an alternate embodiment, the selectable assembly contexts for reference creation may include assembly contexts for assemblies different than the assembly for the model being edited. This allows part design to reference multiple assemblies, allowing design of a part in a way to ensure the part is useable in the multiple assemblies.

The methods and systems described herein may be implemented in hardware, software or any combination of hardware and software suitable for a particular application. The hardware may include a general purpose computer and/or dedicated computing device or specific computing device or particular aspect or component of a specific computing device, including mobile computing devices such as, but not limited to, cell phones, mobile phones, mobile personal digital assistants, laptops, palmtops, netbooks, or tablets. The processes may be realized in one or more microprocessors, micro-controllers, embedded micro-controllers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

The methods and systems described herein may be deployed in part or in whole through network infrastructures. The network infrastructure may include elements such as, but not limited to, computing devices, servers, routers, hubs, firewalls, clients, personal computers, communication devices, routing devices and other active and passive devices, modules and/or other components. The computing and/or non-computing device(s) associated with the network infrastructure may include, apart from other components, a storage medium such as, but not limited to, flash memory, buffer, stack, RAM, or ROM.

The computer software described herein may be stored and/or accessed on machine readable media that may include: computer components, devices, and recording media that retain digital data used for computing for some interval of time; semiconductor storage known as random access memory (RAM); mass storage typically for more permanent storage, such as, but not limited to, solid state drives, optical discs, forms of magnetic storage like hard disks, tapes, drums, cards and other types; processor registers, cache memory, volatile memory, non-volatile memory; optical storage such as CD, DVD; removable media such as flash memory, floppy disks, magnetic tape, standalone RAM disks, removable mass storage, other computer memory such as, but not limited to, dynamic memory, static memory, read/write storage, mutable storage, read only, random access, sequential access, location addressable, file addressable, content addressable, network attached storage, or a storage area network.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for designing parts in context within CAD software, comprising:

displaying a model within an assembly modeling environment of the CAD software;

selecting a part within the displayed model;

creating an assembly context, wherein the assembly context includes:

an assembly state reference to an assembly state at the time the assembly context was created; and a master instance comprising an instance of the selected part;

creating an assembly version which records the displayed assembly state at the time of assembly version creation, and retaining an assembly version reference to the assembly version within the assembly context;

tracking the master instance within the assembly context, wherein the master instance is an instance of the selected part when the assembly context was created, and using the master instance for orientation of the assembly context;

switching to a part modeling environment for editing the selected part prior to recording any in-context references;

displaying, within the part modeling environment of the CAD software, the selected part of an assembly of the model, and further displaying the assembly state of the assembly context around the selected part wherein only the selected part is editable and the assembly state around the selected part is not editable;

selecting one or more geometric elements within the displayed assembly state for use in a reference for one or more features of the part;

recording, within the assembly context, the reference and a topology of the selected one or more geometric elements;

selecting between multiple assembly contexts to create references to geometric elements in different assembly states;

recording, within the assembly context, additional references and topologies of additional geometric elements as the additional geometric elements are selected and referenced by additional features;

exiting the part modeling environment and returning to the assembly modeling environment;

monitoring parts and sub-assemblies of the model for changes which require change to the assembly state of the assembly context, and upon requiring change displaying user interface controls to update references stored in the assembly context;

updating the assembly context by:

identifying a transform of geometry in an assembly coordinate system and a topology from a part environment using a parametric history based reference;

replacing the assembly state of the assembly context with a selected or current assembly state; and copying the identified topology into the assembly context in place of prior topology; and applying the recorded reference and additional references when solving the assembly to update the model.

2. A method for designing parts in context within CAD software, comprising:

displaying, within a part modeling environment of the CAD software, a selected part of an assembly of a model, and further displaying an assembly state of an assembly context around the selected part wherein only the selected part is editable and the assembly state around the selected part is not editable, wherein the assembly context includes:

an assembly state reference to the assembly state at the time the assembly context was created; and a master instance comprising an instance of the selected part;

selecting one or more geometric elements within the displayed assembly state for use in a reference for one or more features of the part;

recording, within the assembly context, the reference and a topology of the selected one or more geometric elements; and applying the recorded reference when solving the assembly to update the model.

3. The method of claim 2, further comprising:

displaying the model within an assembly modeling environment of the CAD software;

selecting the part within the displayed model;

creating the assembly context; and switching to a part modeling environment for editing the selected part.

4. The method of claim 3, further comprising creating an assembly version which records the displayed assembly state at the time of assembly version creation, and retaining a reference to the assembly version within the assembly context.

5. The method of claim 3, further comprising tracking a master instance within the assembly context, wherein the master instance is an instance of the selected part when the assembly context was created, and using the master instance for orientation of the assembly context.

6. The method of claim 3, further comprising exiting the part modeling environment and returning to the assembly modeling environment.

7. The method of claim 2, further comprising selecting between multiple assembly contexts to create references to geometric elements in different assembly states.

8. The method of claim 2, further comprising recording, within the assembly context, additional references and topologies of additional geometric elements as the additional geometric elements are selected and referenced by additional features.

9. The method of claim 2, further comprising monitoring parts and sub-assemblies of the model for changes which require change to the assembly state of the assembly context, and upon requiring change displaying user interface controls to update references stored in the assembly context.

10. The method of claim 9, further comprising updating the assembly context by:

identifying a transform of geometry in an assembly coordinate system and a topology from a part environment using a parametric history based reference;

replacing the assembly state of the assembly context with a selected or current assembly state; and copying the identified topology into the assembly context in place of prior topology and associated minimal body.

11. The method of claim 2, further comprising:

displaying the model within an assembly modeling environment of the CAD software;

selecting the part within the displayed model;

creating the assembly context;

creating an assembly version which records the displayed assembly state at the time of assembly version creation, and retaining a reference to the assembly version within the assembly context;

tracking the master instance within the assembly context, wherein the master instance is an instance of the selected part when the assembly context was created, and using the master instance for orientation of the assembly context;

switching to a part modeling environment for editing the selected part prior to recording any in-context references;

selecting between multiple assembly contexts to create references to geometric elements in different assembly states;

recording, within the assembly context, additional references and topologies of additional geometric elements as the additional geometric elements are selected and referenced by additional features;

exiting the part modeling environment and returning to assembly modeling;

monitoring parts and sub-assemblies of the model for changes which require change to the assembly state of the assembly context, and upon requiring change displaying user interface controls to update references stored in the assembly context; and updating the assembly context by:

identifying a transform of geometry in an assembly coordinate system and a topology from a part environment using a parametric history based reference;

replacing the assembly state of the assembly context with a selected or current assembly state; and copying the identified topology into the assembly context in place of prior topology.

* * * * *